(12) United States Patent
Agarwal et al.

(10) Patent No.: US 6,311,179 B1
(45) Date of Patent: Oct. 30, 2001

(54) SYSTEM AND METHOD OF GENERATING ASSOCIATIONS

(75) Inventors: Ramesh C. Agarwal; Charu C. Aggarwal, both of Yorktown Heights, NY (US); V. V. V. Prasad, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/183,410

(22) Filed: Oct. 30, 1998

(51) Int. Cl.[7] ............................................. G06F 17/30
(52) U.S. Cl. ..................... 707/3; 707/2; 707/4; 707/6; 707/5; 707/201
(58) Field of Search .................. 707/2, 3, 4, 5, 707/6; 345/346; 705/10, 201

(56) References Cited

U.S. PATENT DOCUMENTS

| | | | |
|---|---|---|---|
| 4,554,631 | * 11/1985 | Reddington | 707/4 |
| 5,615,341 | * 3/1997 | Agrawal et al. | 705/10 |
| 5,758,147 | * 5/1998 | Chen et al. | 707/6 |
| 5,758,353 | * 5/1998 | Marquis | 707/201 |
| 5,842,200 | * 11/1998 | Agrawal et al. | 707/1 |
| 5,920,855 | * 7/1999 | Aggarwal et al. | 707/3 |
| 5,930,805 | * 7/1999 | Marquis | 707/201 |
| 5,987,468 | * 11/1999 | Singh et al. | 707/100 |
| 6,006,225 | * 12/1999 | Bowman et al. | 707/5 |
| 6,092,064 | * 7/2000 | Aggarwal et al. | 707/6 |

(List continued on next page.)

OTHER PUBLICATIONS

"Efficient Algorithms for Discovering Association Rules" by Heikki Mannila, et al., pp. 181–192, University of Helsinki, Department of Computer Science, Helsinki, Finland, 1994.

"Clustering Association Rules" by Brian Lent, et al., pp. 220–231, Department of Computer Science, Stanford University, Stanford, CA, Apr. 1997.

"Mining Association Rules between Sets of Items in Large Databases" by Rakesh Agrawal, et al., pp. 207–216, IBM Almaden Research Center, San Jose, CA, May 1993.

"Fast Algorithms for Mining Association Rules", by Rakesh Agrawal, et al., pp. 487–499, IBM Almaden Research Center, San Jose, CA, 1994.

"An Efficient Algorithm for Mining Association Rules in Large Databases" by Ashok Savasere, et al., pp. 432–444, College of Computing, Georgia Institute of Technology, Atlanta, GA, 1995.

(List continued on next page.)

Primary Examiner—Kim Vu
Assistant Examiner—Anh Ly
(74) Attorney, Agent, or Firm—Scully, Scott, Murphy & Presser; Gail H. Zarick, Esq.

(57) ABSTRACT

A method for automatically generating associations of items included in a database. A user first specifies a support criteria indicating a strength of desired associations of items contained in the said database. Then, a recursive program is executed for generating a hierarchical tree structure comprising one or more levels of database itemsets, with each itemset representing item associations determined to have satisfied the specified support criteria. The recursive program includes steps of: characterizing nodes of the tree structure as being either active and enabling generation of new nodes at a new level of the tree, or inactive, at any given time; enabling traversal of the tree structure in a predetermined manner and projecting each of the transactions included in the database onto currently active nodes of the tree structure to generate projected transaction results; and, counting the projected transaction results of the projected transactions at the active nodes to determine whether the further itemsets satisfy the specified support criteria. All itemsets meeting the specified support criteria are added to the tree structure at a new level.

34 Claims, 7 Drawing Sheets

U.S. PATENT DOCUMENTS

| | | | |
|---|---|---|---|
| 6,092,065 | * | 7/2000 | Floratos et al. ............................ 707/6 |
| 6,108,004 | * | 8/2000 | Medl .................................... 345/346 |
| 6,108,686 | * | 8/2000 | Floratos et al. ....................... 707/104 |
| 6,138,117 | * | 10/2000 | Bayardo ................................... 707/6 |

OTHER PUBLICATIONS

"Mining Generalized Association Rules" by Ramakrishnan Srikant, et al., pp. 406–419, Proceedings of the 21st International Conference on Very Large Data Bases, Zurich, Switerland, Sep. 1995.

"An Effective Hash–Based Algorithm for Mining Association Rules" by John Soo Park, et al., pp. 175–186, IBM Thomas J. Watson Research Center, Yorktown Heights, NY, 1995.

"Sampling Large Databases for Association Rules:" by Hannu Toivonen, pp. 134–145, University of Helsinki, Department of Computer Science, Helsinki, Finland, 1996.

"Mining Quantitative Association Rules in Large Relational Tables" by Ramakrishnan Srikant, et al.,, pp. 1–12, IBM Almaden Research Center, San Jose, CA, 1996.

"Dynamic Itemset Counting and Implication Rules for Market Basket Data" by Sergey Brin, et al., pp. 255–264, Department of Computer Science, Stanford University, Stanford, CA, 1997.

"Efficiently Mining Long Patterns from Databases" by Roberto J. Bayardo, Jr., pp. 85–93, IBM Almaden Research Center, San Jose, CA, 1998.

* cited by examiner

FIG. 5(b): PRUNING INACTIVE NODES

SYSTEM AND METHOD OF GENERATING ASSOCIATIONS

BACKGROUND OF THE INVENTION

1. Field of the Invention

The present invention relates generally to the field of data mining, and more particularly, a novel data mining system and search methodology for generating associations among items in a large database.

2. Discussion of the Prior Art

The problem of finding association rules was introduced in a reference entitled "Mining Association Rules Between Sets of Items in Very Large Databases," Proceedings of the ACM SIGMOD Conference on Management of Data, pages 207–216, 1993 authored by Agrawal R., Imielinski T., and Swami A. The problem identified in the reference was directed to finding the relationships between different items in a large database, e.g., a database containing customer transactions. Such information can be used for many sales purposes such as target marketing, because the buying patterns of consumers can be inferred from one another.

As described in the above-mentioned reference, there is first identified a set {I} comprising all items in the database of transactions. A transaction {T} which is a subset of {I} is defined to be a set of items which are bought together in one operation. An association rule between a set of items {X} which is a subset of {I} and another set {Y} which is also a subset of {I} is expressed as {X}=>{Y}, and indicates that the presence of the items X in the transaction also indicates a strong possibility of the presence of the set of items Y. The measures used to indicate the strength of an association rule are support and confidence. The support of the rule X=>Y is the fraction of the transactions containing both X and Y. The confidence of the rule X=>Y is the fraction of the transactions containing X which also contain Y. In the association rule problem, it is desired to find all rules above a minimum level of support and confidence. The primary concept behind most association rule algorithms is a two phase procedure: In the first phase, all frequent itemsets (or large itemsets) are found. An itemset is "frequent" or large if it satisfies a user-defined minimum support requirement. The second phase uses these frequent itemsets in order to generate all the rules which satisfy the user specified minimum confidence.

Since its initial formulation, considerable research effort has been devoted to the association rule problem. A number of algorithms for large itemset generation have been proposed, such as those found in Agrawal R., Mannila H., Srikant R., Toivonen H., and Verkamo A. I. "Fast Discovery of Association Rules." Advances in Knowledge Discovery and Data Mining, AAAI/MIT Press, Chapter 12, pages 307–328. Proceedings of the 20th International Conference on Very Large Data Bases, pages 478–499, 1994. and Brin S., Motwani R. Ullman J. D. and Tsur S., "Dynamic Itemset Counting and Implication Rules for Market Basket Data." Proceedings of the ACM SIGMOD, 1997. pages 255–264. Variations of association rules such as generalized association rules, quantitative association rules and multilevel association rules have been studied in Srikant R., and Agrawal R., "Mining Generalized Association Rules." Proceedings of the 21st International Conference on Very Large Data Bases, 1995, pages 407–419, and, Srikant R., and Agrawal R. "Mining Quantitative Association Rules in Large Relational Tables," Proceedings of the ACM SIGMOD Conference on Management of Data, 1996, pages 1–12.

Although there are many previously proposed methods and systems, there is no efficient method which can generate large itemsets for very large scale problems. For these problems, current techniques require too much time to be of any practical use. The importance of solving such large scale problems is quite great, given the fact that most databases containing customer transaction data are quite large.

SUMMARY OF THE INVENTION

The present invention is directed to a system and method for generating large database itemsets for very large scale problems. The system particularly employs the use of a lexicographic tree structural representation of large itemsets in the database that is particularly adapted for handling large scale problems.

According to the principles of the invention there is provided a system and method for automatically generating associations of items included in a database. A user first specifies a support criteria indicating a strength of desired associations of items contained in the said database. Then, a recursive or non-recursive program is executed for generating a hierarchical tree structure comprising one or more levels of database itemsets, with each itemset representing item associations determined to have satisfied the specified support criteria. The recursive program includes steps of characterizing nodes of the tree structure as being either active and enabling generation of new nodes at a new level of the tree, or inactive, at any given time; enabling traversal of the tree structure in a predetermined manner and projecting each of the transactions included in the database onto currently active nodes of the tree structure to generate projected transaction sets; and counting the support of the candidate extensions of nodes to determine whether the further itemsets satisfy the specified support criteria. All itemsets meeting the specified support criteria are added to the tree structure at a new level.

Advantageously, by projecting transactions upon the lexicographic tree structure, the CPU time for counting large itemsets is substantially reduced.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 5(*a*) is a flow diagram describing the process of pruning inactive nodes from the lexicographic tree, and FIG. 5(*b*) is an example pseudo-code depiction of the pruning tree process;

FIG. 6(*a*) is a flow diagram describing a non-recursive "depth-first" process of projecting a block of transactions down the different nodes in the lexicographic tree for counting;

FIG. 6(*b*) is a flow chart depicting the recursive "depth first" transaction projection strategy.

DETAILED DESCRIPTION OF THE INVENTION

Figure 1:
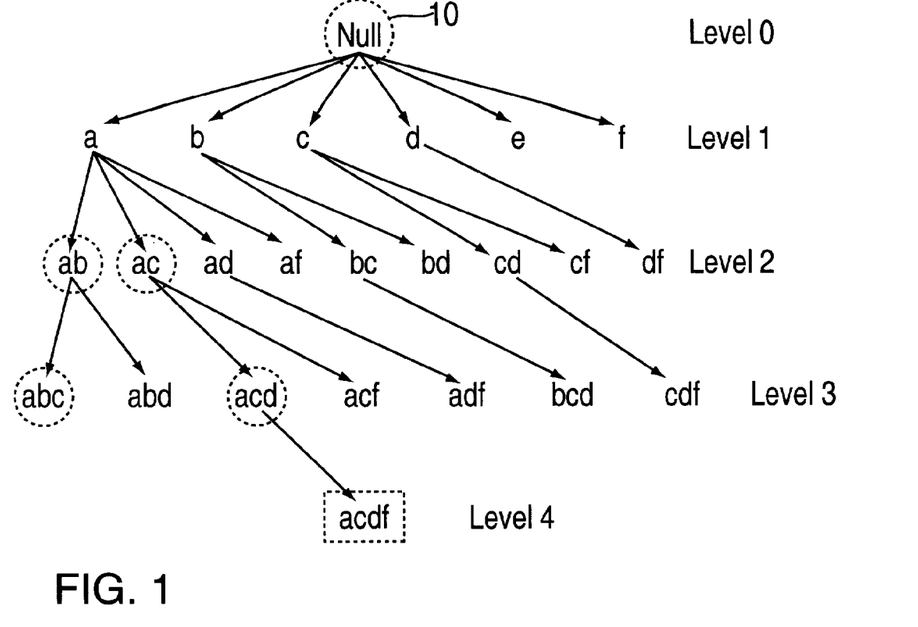
FIG. 1 is a diagram depicting a lexicographic tree graph structure which is used to count the itemsets of a large database.

FIG. 1 is an example of the lexicographic tree structure 10 representing items in a large database defined as existing in a lexicographic ordering. As shown in FIG. 1, the tree 10 includes: (1) A vertex corresponding to each large itemset with the root of the tree corresponding to the null itemset; and, (2) nodes I={i1, ..., ik} representing a large itemset, where i1, i2, ..., ik are listed in a lexicographic order. The parent of the node I is the itemset {i1, ... i(k−1)}. Various levels are indicated in the lexicographic tree that correspond to the sizes of the corresponding itemsets. Thus, for the example lexicographic tree 10 in FIG. 1, levels 0–4 are indicated, with level 0 being the empty or "null" node.

Additionally defined is a "frequent lexicographic tree extension" or, "tree extension" of an itemset which comprises those items that contribute to the extension and forming an edge in the lexicographic tree 10. In the example illustrated in FIG. 1, the frequent lexicographic extensions of node "a" are b, c, d, and f. For purposes of discussion, the set of frequent lexicographic tree extensions of a node "P" is denoted as E(P). Additionally defined is the immediate ancestor "Q" of the itemset P in the lexicographic tree. The set of "candidate branches" of a node P is defined to be those items in E(Q) which occur lexicographically after the node P. These are the possible frequent lexicographic extensions of P in a set denoted as R(P).

Thus, in view of FIG. 1, the following relationships are defined: E(P) is a subset of R(P), which is a subset of E(Q). The value of E(P) in FIG. 1, when P=ab is {c,d}. The value of R(P) for P=ab is {c, d, f}, and for P=af, R(P) is empty.

For purposes of discussion, a node "P" is said to be "generated" when for the first time its existence is discovered by virtue of an extension of its parent. A node is further said to have been "examined" when its frequent lexicographic tree extensions have been determined. Thus, the process of examination of a node P results in generation of further nodes, unless the set E(P) for that node is empty. Thus, a node can be examined only after it has been generated.

The present invention is a methodology that enables the construction of a lexicographic tree in top-down fashion by starting at the null node (FIG. 1) and successively generating nodes until all nodes have been generated and subsequently examined. At any point in the implementation of the method, a node in the lexicographic tree is defined to be inactive, if all descendants of that node have already been generated. This implies that the sub-tree rooted at that node can not be further extended. Otherwise, the node is said to be active. Thus, the event of a node being active or inactive is dependent on the current state of the method which is generating the nodes. A node which has just been generated is always born active, but it becomes inactive later when all its descendants have been determined. In the illustrative example shown in FIG. 1, assuming that all nodes up to and including level 2 have already been examined, i.e., all nodes up to and including level 3 have been generated, the set of active nodes include those nodes labeled: abc, acd, ab, ac, a, and null. Thus, even though there are 23 nodes corresponding to the Levels 0–3 which have been generated, only 6 of them are active. Note that unexamined nodes "abd" and "acf" are not marked as active since the set of candidate branches for these nodes is empty.

An active node is said to be a boundary node if it has been generated but not examined. In the illustrative example of FIG. 1, the active boundary node set is {abc, acd}. As can be seen from the complete tree structure in the example of FIG. 1, the subsequent examination of the node "abc" will not lead to any further extensions, while the examination of the node "acd" will lead to the node "acdf."

The extension set E(P) is produced when P is first examined. As the methodology progresses, some of these frequent extensions are no longer active. The term AE(P) thus denotes the subset of E(P) which is currently active, and are referred to herein as "active extensions." These active extensions represent the branches at a node P which are currently active.

Additionally referred to herein is the set of "active items," F(P), at a node P that is recursively defined as follows: (1) If the node P is a boundary node, then F(P)=R(P). (2) If the node P is not a boundary node, then F(P) is the union of AE(P) with active items of all nodes included in AE(P). Clearly, F(P) is a subset of E(P) and is a set which reduces in size when more itemsets are generated, since fewer number of items form active extensions. For the example tree structure shown in FIG. 1, for the null node, the only active extension is a, and the set of active items is {a, b, c, d, f}. It may also be noted that AE(P) is a subset of F(P). For node a, its active extensions are {b, c}, and the set of active items is {b, c, d, f}.

The methodology for constructing a lexicographic tree structure representing associated items of a large database that meets minimum support requirements is now described in greater detail.

During the lexicographic tree construction methodology of the invention, the following information is stored at each node: (1) the itemset P at that node; (2) the set of lexicographic tree extensions at that node which are currently active, i.e., AE(P); and, (3) the set of active items F(P) at that node. F(P) and AE(P) are updated whenever the set of boundary nodes changes.

Let "P" be a node in the lexicographic tree corresponding to a frequent itemset. Then, for a transaction T, a projected transaction T(P) is defined as being equal to (T (intersection) F(P)) where "intersection" refers to the set intersection operation. However, if T does not contain the itemset corresponding to node P then T(P) is null. If T(P) has less than two items then also it is eliminated because a transaction T(P) with less than two items does not contain any information which is necessary to count itemsets which are descendants of the node P. Actually, for the transaction to be useful at a non-boundary node P, more items are needed in T(P). The exact number depends on the depth of boundary nodes from node P. For a set or block of transactions "Tau," the projected transaction set Tau(P) is defined as the set of projected transactions in Tau with respect to active items F(P) at P.

For example, consider a transaction "abcdefghk" applied to the illustrative lexicographic tree 10 of FIG. 1, the projected transaction at node "null" would be {a, b, c, d, e, f, g, h, k} (intersection) {a, b, c, d, f}=abcdf. The projected transaction at node "a" would be bcdf. For the transaction abdefg, its projection on node ac is null because it does not contain the required itemset "ac."

In the discussion of the preferred methodology of the invention, the following points are emphasized: (1) An inactive node does not provide any extra information which is useful for further processing and thus, can be eliminated from the lexicographic tree; and, (2) for a given transaction T, the information required to count the support of any itemset which is a descendant of a node P is completely contained in T(P).

Figure 2:
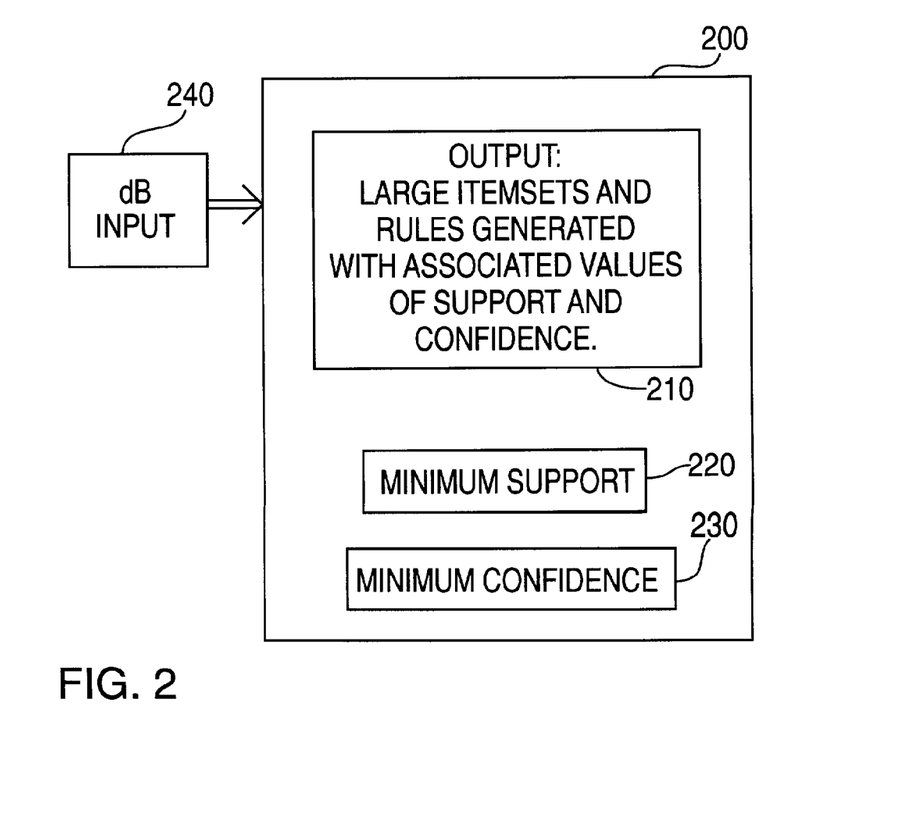
FIG. 2 is a general description of the user interface provided for using the system of the invention.

FIG. 2 illustrates an example user-interface having entry fields 220 and 230 enabling users to specify values of minimum support and minimum confidence, respectively. In response to these entries, large itemsets and rules are generated in accordance with the method of the invention for display in screen display area 210. Associated with each large itemset is a minimum support value, while associated with each rule is a minimum confidence value. A database 240 is additionally provided that is populated with records of all commercial transactions, e.g., customer retail purchases collected over a particular time period. Each transaction record includes: a transaction id, and a number of corresponding actual item ids, comprising as SKU codes, for example, pertaining to a customer's transaction or purchase. As will be described, the transactions from this database 240 are projected onto the active nodes of the tree 10 in the node examination process.

It should be understood that various strategies are feasible for lexicographic tree creation and is a design choice depending upon trade-offs in I/O, memory, and CPU performance. For instance, either all nodes at level k may be created before nodes at level (k+1), or longer patterns may be discovered earlier in order to remove some of the other branches of the tree. One such strategy implements a "breadth-first" search, where all nodes at level k are created before nodes at level (k+1). Another strategy implements a "depth-first" creation, with all frequent descendants of a given node determined before any other node.

In breadth-first creation, all nodes at level k are created before nodes at level (k+1). At any given level k, the information regarding the possible items which can form frequent lexicographic extensions of it can be obtained from its parent at level (k−1). A given item i may be a frequent lexicographic extension of a node only if it is also a frequent lexicographic extension of its immediate parent and occurs lexicographically after it. Thus, while finding (k+1)-itemsets, all possible frequent lexicographic extensions of each (k−1)-itemset are determined. For a given node at level (k−1), if there are m such extensions, then there are m(m−1)/2 possible (k+1)-itemsets which are descendants of this (k−1)-itemset. In order to count these m(m−1)/2 possible extensions, use is made of projected transaction sets which are stored at that node. The use of projected transaction sets in counting support is important in the reduction of the CPU time for counting large itemsets.

Figure 3:
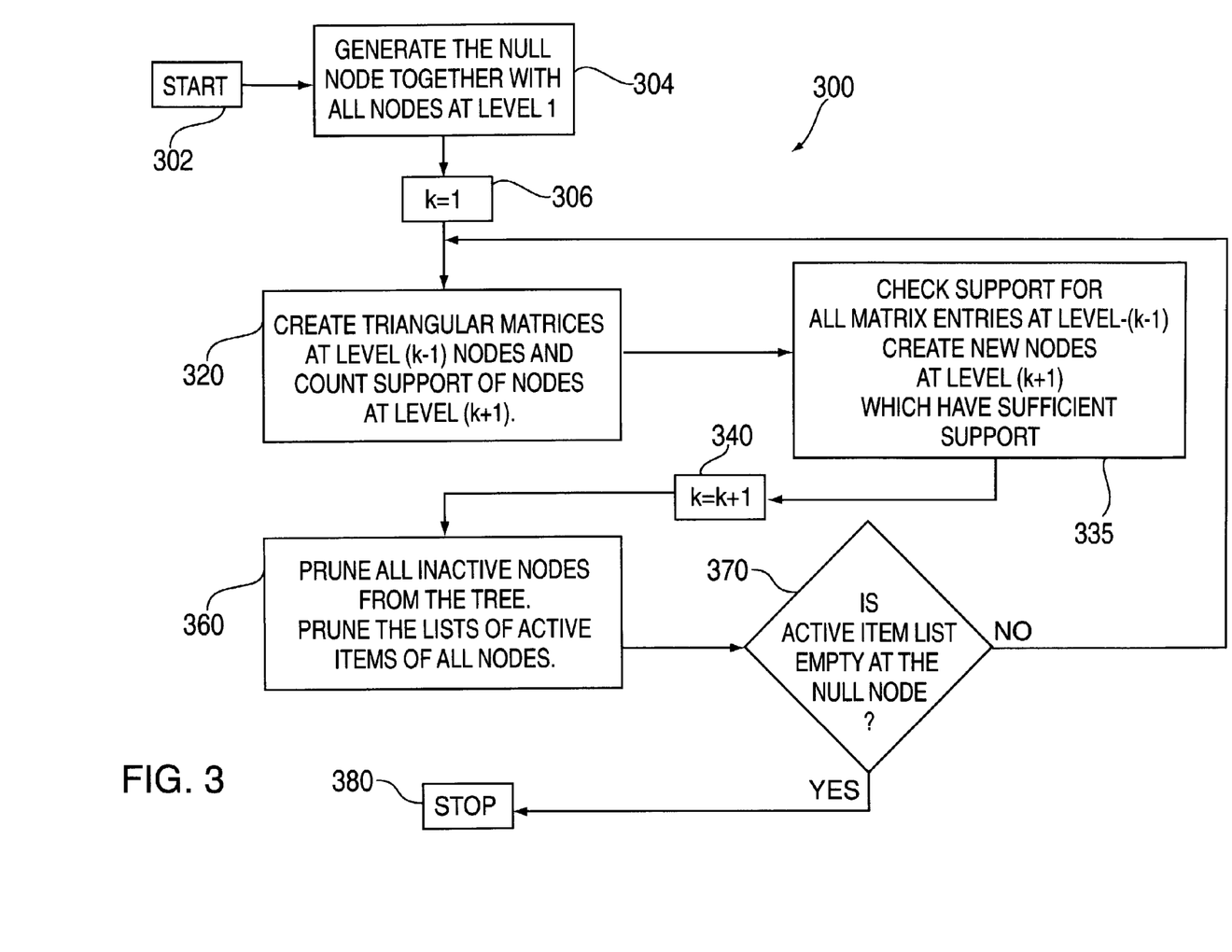
FIG. 3 is a high-level flow diagram depicting the breadth-first creation of the lexicographic tree implemented in the methodology of the invention.

The overall process of a "breadth-first" search 300 in accordance with the invention is illustrated as shown in FIG. 3. At steps 302 and 304, the null node for the lexicographic tree is generated, as are all the nodes at level 1, which may be accomplished by evaluating the support of each item in the database. Thus, the first two levels of the tree are built. At step 306 a counter "k" denoting the last level of the tree which has so far been generated, is set to 1. At step 320, matrices to the level -(k−1) nodes are created and the support of the candidate nodes at level (k+1) are counted. As will be described in greater detail, counting of support of nodes at level k+1 entails projecting transactions to the level k−1 node, and particularly, counting corresponding items of the projected transactions by incrementing corresponding entries in a triangular matrix maintained at that node. Thus, in first pass through the algorithm 300, it is desired to generate new nodes at level k+1. To do this, a triangular matrix is first generated at the null node (K−1=0; K=1), comprising all of the possible candidate doubles (itemsets) which may be generated at level 2 (K=1, K+1=2).

Generally, the process of counting support of the (k+1)-itemsets is accomplished as follows: Letting P be any (k−1)-itemset whose frequent extensions E(P) (nodes at level k) have already been determined. At each such node P, a matrix of size |E(P)|*|E(P)| is maintained. A row and column exists in this matrix for each item "i" in E(P). As will be described in greater detail with respect to FIG. 4, the $(i,j)^{th}$ entry of this matrix indicates the count of the itemset [P (union) {i, j}] where "union" refers to the set union operation. Since the matrix is symmetric, only the lower triangular part of the matrix is maintained. For the illustrative example of FIG. 1, the triangular matrix maintained at the null node for the k=1 iteration (finding nodes at k=2) is depicted as follows:

$$\begin{bmatrix} ab & & & & \\ ac & bc & & & \\ ad & bd & cd & & \\ ae & be & ce & de & \\ af & bf & cf & df & ef \end{bmatrix}$$

For each item pair {i, j} in the projected transaction T(P), the entry (i, j) in this matrix is incremented by one. As further shown in FIG. 3, at step 335, a determination of the support of all the candidate nodes (k+1 level) in the lexicographic tree is made, and, new nodes at level (k+1) of the tree which have sufficient support, are generated. Particularly, once the process of counting is complete, the frequent (k+1)-itemsets which are descendants of P is determined by using those entries in the matrix which have support larger than the user-defined minimum support value, as indicated at step 335, FIG. 3. Then, as indicated at step 340, the counter k is incremented by 1, and, at step 360, all inactive nodes and list of active items from the tree are "pruned." At step 370, a determination is made as to whether the active item list at the node null is empty. If the active item list at node null is empty, the method terminates at step 380, i.e., no more (k+1) level nodes can be generated. Otherwise, the process returns to step 320 of FIG. 3 where the counting of support for active nodes at the next active level (k+1) is made. As shown in FIG. 3, the process of generating large (k+1)-itemsets from k-itemsets is repeated for increasing k until the $k^{th}$ level of the tree is null, i.e., all the nodes in the tree are inactive.

The hierarchical structure of the lexicographic tree is useful in creating a set of projected transactions for the (k−1)-itemsets. This is quite important in the reduction of CPU time for itemset counting, as will be described in greater detail. The transactions may be projected recursively down the tree in order to create all the projected sets up to the $(k-1)^{th}$ level. This projected set is a small subset of the original transaction set for each node. However, the total space occupied by the projected transactions over all nodes may be much larger than the original database size. Thus, it may be necessary to read a block of transactions from the database into main memory, create the projected transactions up to the $(k-1)^{th}$ level, and use these projected transactions to add to the counts of the matrices maintained at that level.

Figure 4:
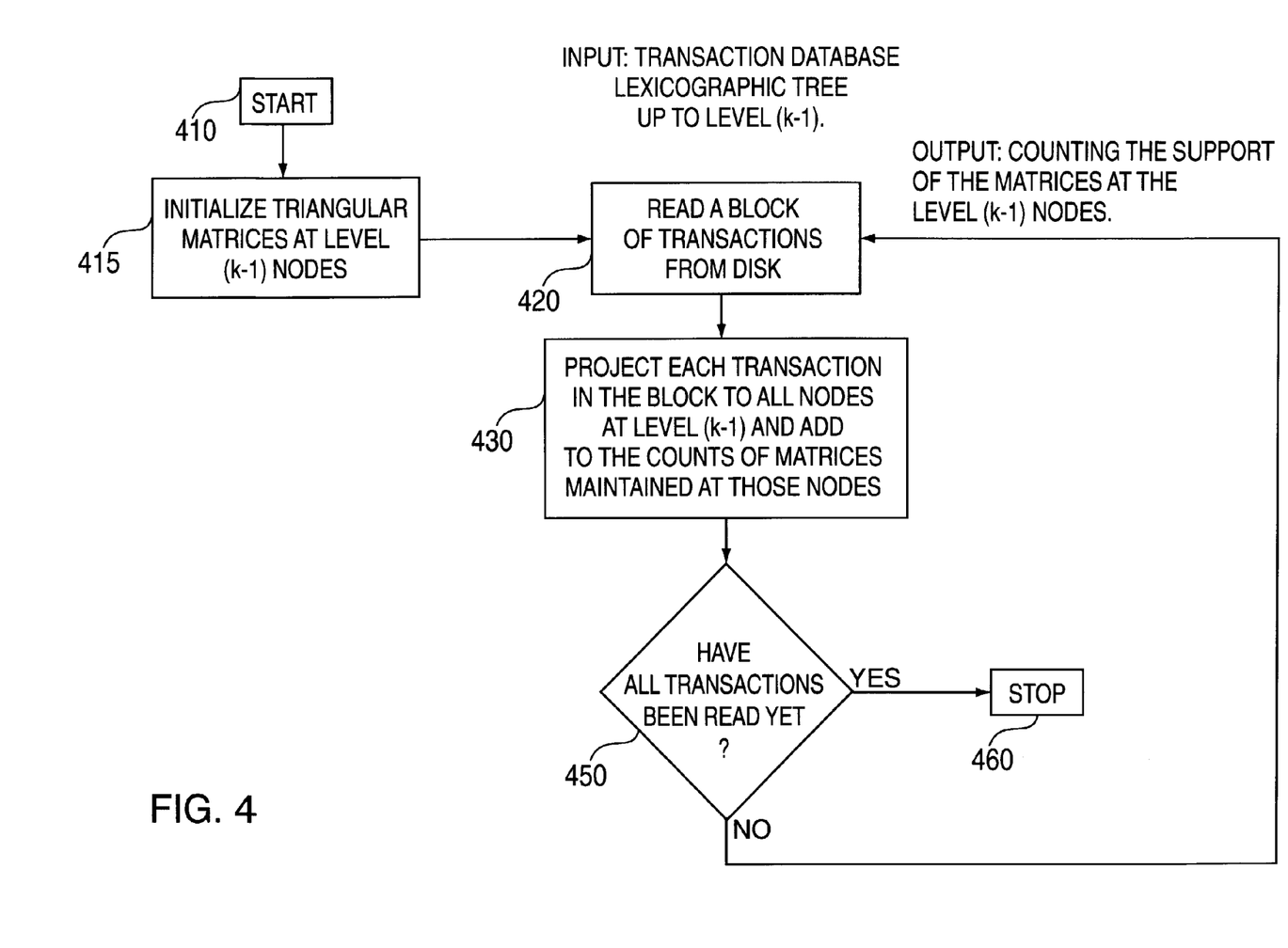
FIG. 4 is a more detailed flow diagram illustrating the counting step 320 of FIG. 3.

The process of counting the support of the matrices at the level (k−1) nodes (step 320, FIG. 3) is now described in greater detail in view of FIG. 4. As shown in FIG. 4, at step 410, the transaction database and the lexicographic tree up to level (k−1) is input to the process illustrated in FIG. 4. As shown at step 415, triangular matrices at level (k−1) nodes are initialized. At step 420, a block of transactions are read from the database 240 (FIG. 2) or disk, and each transaction in the block is projected to all nodes at level (k−1), as indicated at step 430, and described in further detail herein with reference to FIGS. 6(a) and 6(b). Additionally, at step 430, the counts of the matrices maintained at those (k−1)$^{th}$ level nodes are incremented. Then, at step 450, a check is made to determine if all transactions have been read, and if all transactions have been read, the process terminates at step 460. Otherwise, if more transactions need to be read out of the database, the process steps 420–450 repeat until all of the transactions have been read.

Figure 6A:
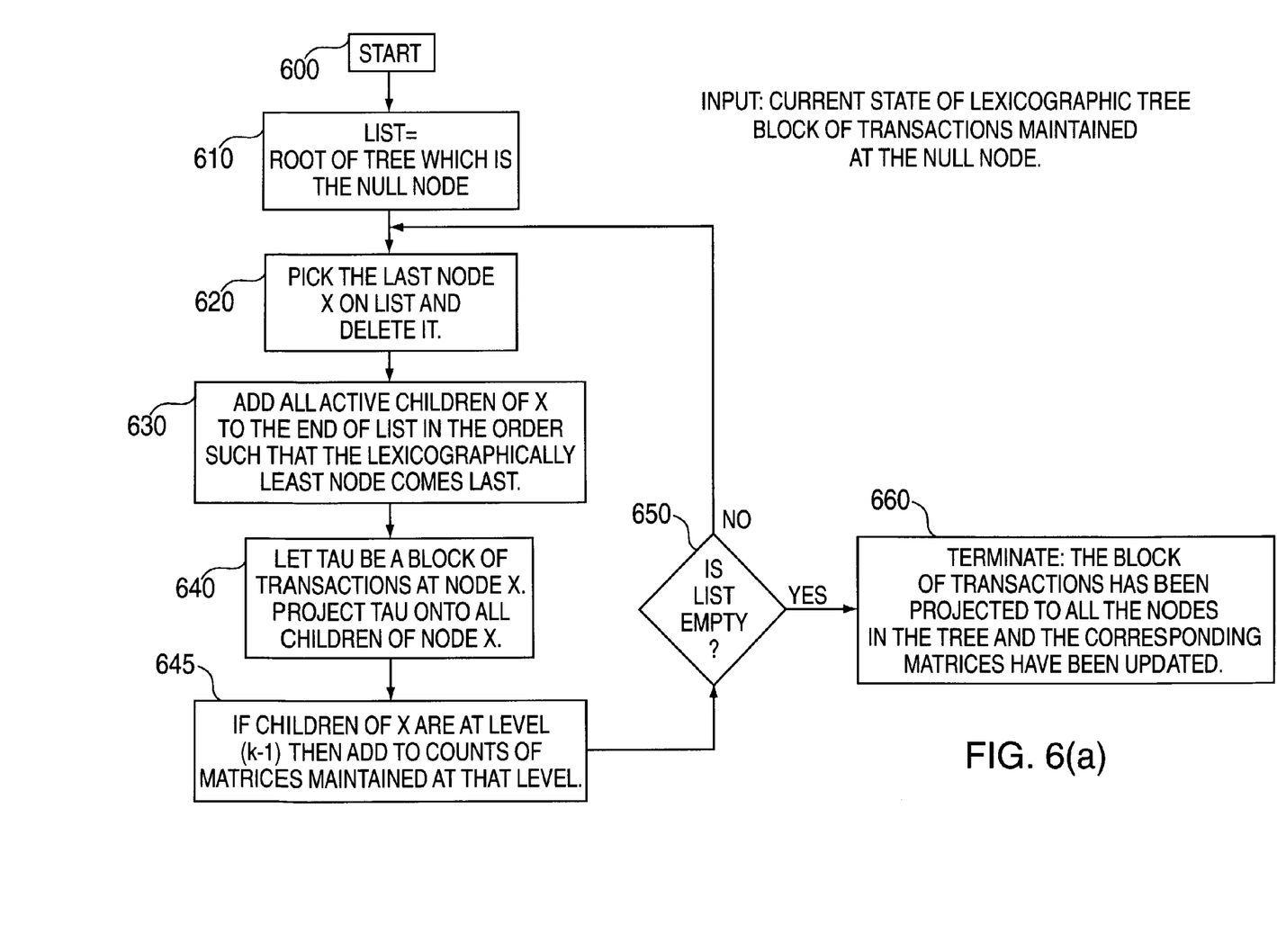
Figure 6B:
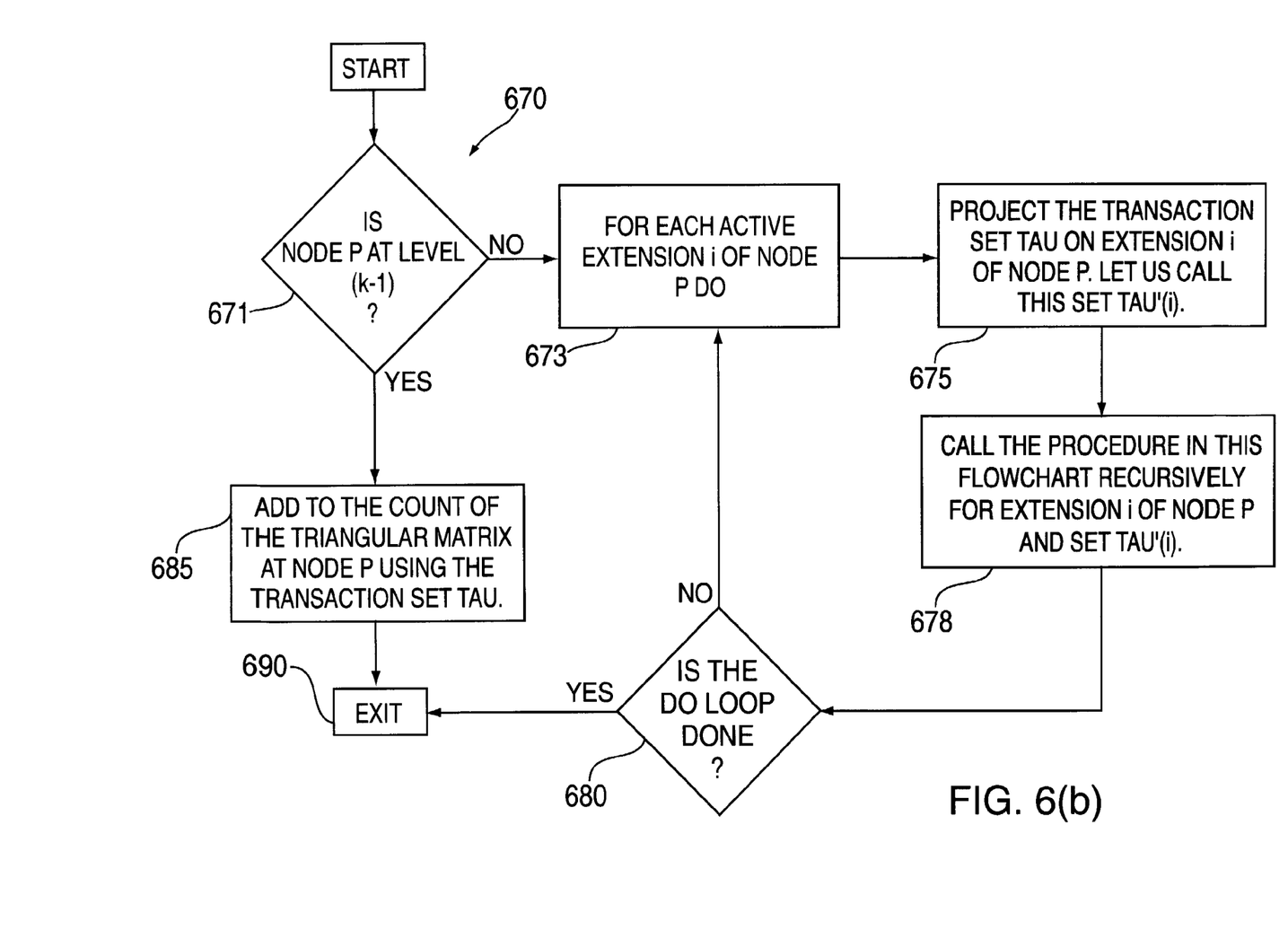

The process of transaction projection and counting for each block, as indicated at step 430 of FIG. 4, is now described in greater detail in view of FIGS. 6(a) and 6(b). It is understood that several strategies may be implemented in projecting transactions to boundary nodes where eventual counting is done. These strategies include: a "breadth-first" order wherein all transactions in the database are projected to all nodes at a level k−1 in order to create the nodes at level k+1; a "depth-first" order strategy wherein all transactions in a block are projected in a depth first order.

When a block of transactions is simultaneously projected to all nodes at level −(k−1) in a breadth first order, the total amount of memory required for all projections is very large. The memory requirements may be reduced by doing the projections in a "depth-first" order. In this scheme, the projected transaction sets are maintained for all nodes (and their siblings) for the path from the root to the node [at level −(k−1)] which is currently being extended.

FIG. 6(a) illustrates a non-recursive "depth-first" order strategy wherein transaction projection at boundary nodes is performed for all active nodes and extensions along a particular path. As shown at step 610, FIG. 6(a), an ordered "LIST" of nodes to be used in order to perform the tree exploration, is maintained, with the LIST set to be the root of the tree, i.e., the null node. As indicated at step 620, the last node "X" on LIST is picked, and deleted from the LIST. At step 630, all children of "X" are added to the end of LIST, such that the lexicographically least node comes last. With Tau being the set of transactions at node X, Tau is projected onto all children of node X, as indicated at step 640. When a transaction set is projected onto a node at level (k−1), the counts of the matrices which are maintained at that level are added. Thus, it is necessary to update the counts for the matrices maintained at each sibling node incrementally, i.e., one by one. The details of how a set of projected transactions is used in order to add to the counts of the matrix at a level is hereinafter described in greater detail with respect to FIG. 7. At step 650, FIG. 6(a), a check is then made to determine if the LIST is empty. If the LIST is empty, the process terminates at step 660, since the set of transactions has been projected to all the nodes in the tree. Otherwise, the process returns to step 620. It should be understood that the procedure in FIG. 6(a) is optional and may not be necessary for counting large 1-itemsets.

In another embodiment, the process of transaction projection and counting may be performed recursively, such as depicted by the flow diagram shown in FIG. 6(b). In FIG. 6(b), transaction projection and counting is performed recursively down the lexicographic tree 10 in order to create all the projected transaction sets up to the level (k−1). Each projected set is a small subset of the original transaction set for each node. The method 670 of FIG. 6(b) is a recursive implementation of step 430, FIG. 4, which projects a block of transactions to all nodes at level (k−1) in depth-first order, and adds the counts of the matrices maintained at those nodes. As shown at step 671, a determination is first made as to whether node N is at level (k−1). If node N is not at level (k−1), then a recursive do loop begins at step 673. In the loop, at step 675, transaction set Tau is projected onto the i$^{th}$ extension of node N, now defined as Tau' (i), and, at step 678, the procedure calls itself recursively for extension I of node N and transaction set Tau' (i). At step 680, a determination is made as to whether the do loop is done, and if so, terminates at step 690. When the node is at level (k−1), the process proceeds to step 685 where the counts are added to the triangular matrix at node N using the transaction set Tau.

The method of performing the projections in FIG. 6(b) seems to indicate that the projection at a node occurs in pure depth-first order. However, in order to avoid multiple passes through the transaction set, the projections are performed to all the children of a given node at the same time. The embodiment of FIG. 6(a) clearly shows this detail. Preferably, upon a determination that a projection is no longer needed, that projection is deleted, thus freeing up memory which can be utilized for the next set of projections.

As previously mentioned, step 360 of FIG. 3 provides for the pruning of all those nodes which have been determined to be inactive. That is, after all frequent level (k+1)-itemsets have been determined, the nodes which are inactive are pruned. Thus, in the next iteration, when level (k+2)-itemsets are being counted, the time for projecting transactions is greatly reduced as only active nodes are used in the projection. Thus, at any node P, as the algorithm progresses, the projected transaction set Tau(P) keeps shrinking both in terms of the number of transactions as well as the number of items in transactions. This is because the active itemset F(P) is also shrinking as the algorithm progresses. Thus, if a tree at level-k is being generated, then for a node P at level-m, the projection of a transaction T(P) must have at least (k-m) items for it to be useful to extend the tree at level-k. If it has fewer items, it is eliminated.

Figures 5A, 5B:
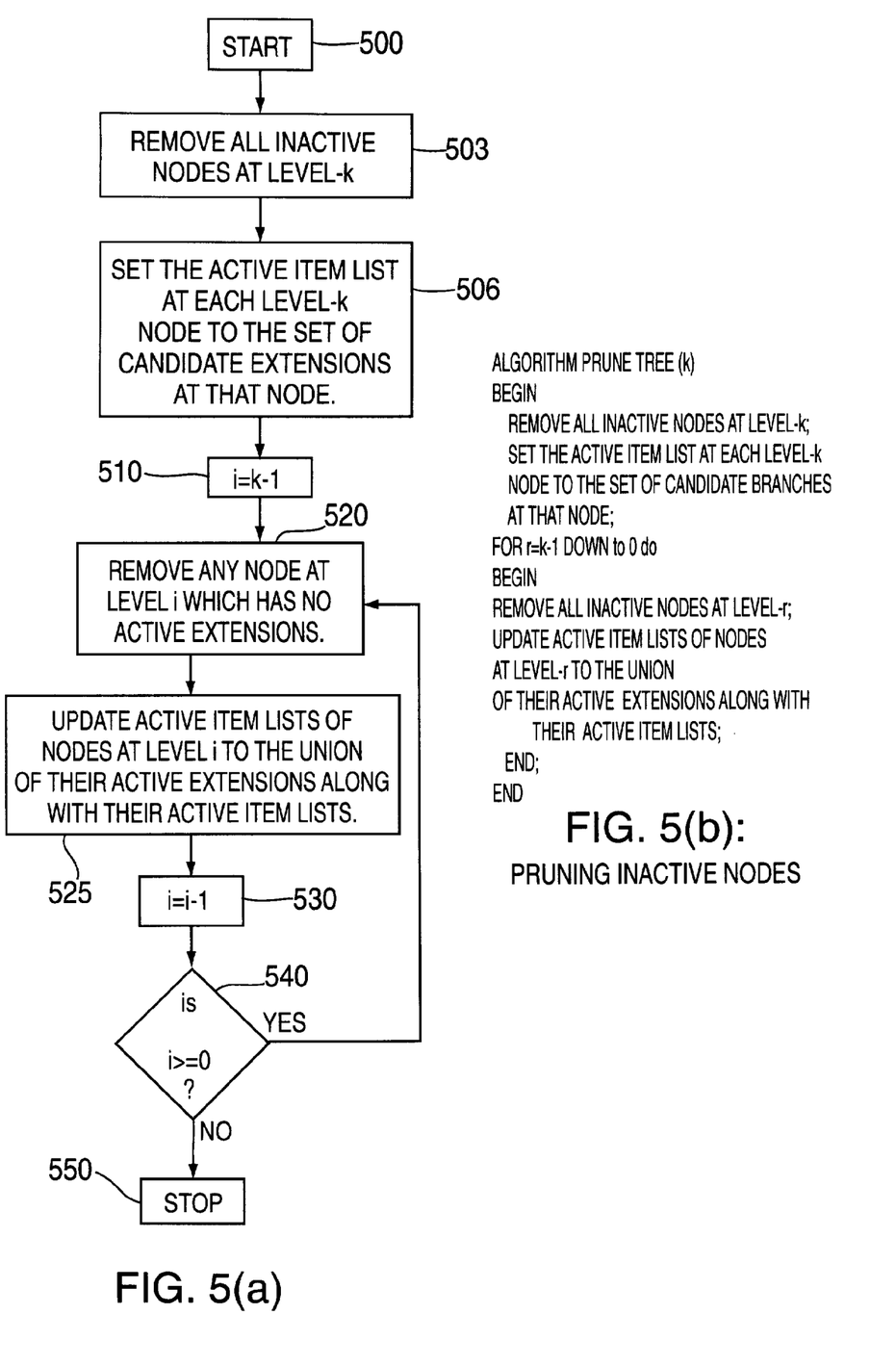

The process of pruning the nodes of the tree is illustrated in FIG. 5(a). At step 500, the current level k of the tree which has just been generated is first input. In step 503, all inactive nodes at level −k are removed. In step 506, the active item list at each level −k node is set to the set of candidate extensions at that node. At step 510, an index i is set equal to k−1, which is the current level of the tree which was being extended. Using recursion, the inactive items are removed from the tree in bottom up fashion. Thus, as indicated at step 520, any node at level i which has no active extensions, is removed. In step 525, the active item lists of the nodes at level i are updated to the union of their active extensions along with their active item lists. In step 530, i is decremented by one, and, at step 540, a check is made to determine if i>=0, i.e., if pruning has occurred for every level up to the null node. If pruning has not occurred for every level up to the null node, then the process returns to step 520 for further removal of nodes at the new level i; otherwise, the process terminates at step 550.

The pseudo-code for pruning the lexicographic tree after (k+1) itemsets have been generated is illustrated in FIG. 5(b). As illustrated in the pseudo-code, the tree is pruned in bottom-up fashion, whence the level (k+1) is pruned first, then the level k, and so on up to level k=0. At the same time, the active lists of the nodes are constructed for the different levels of the tree.

Figure 7A:
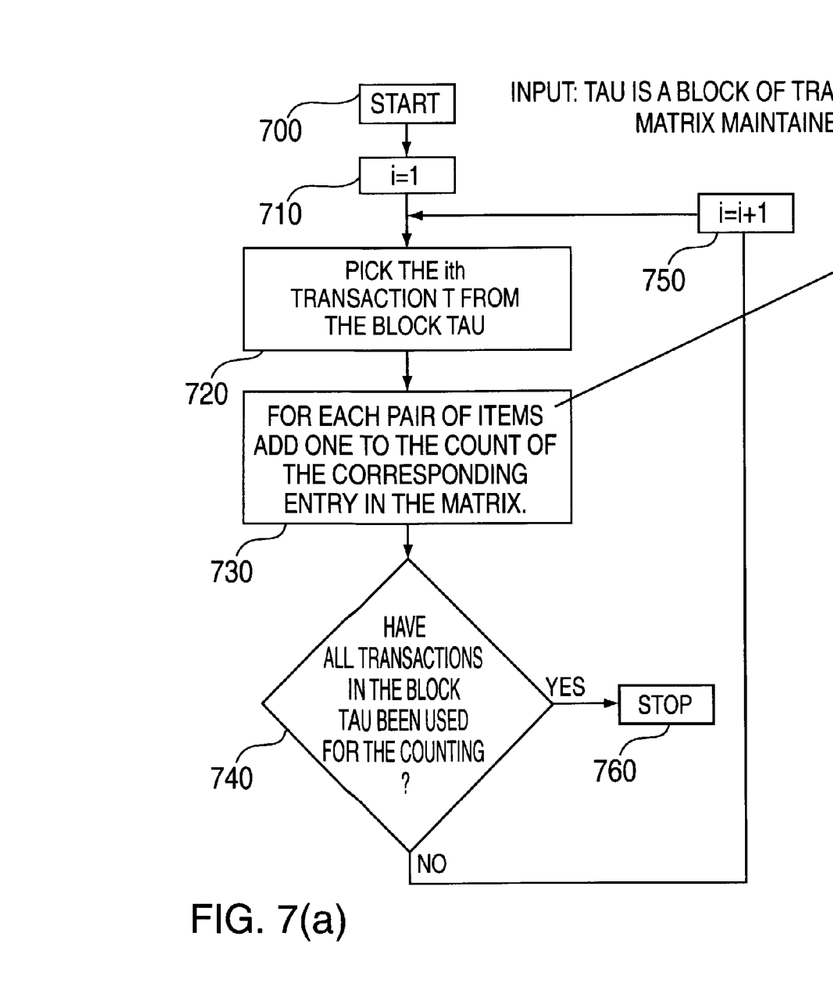
FIGS. 7(a) and 7(b) depict a flow diagram of the process of adding to the counts of the matrices maintained at each level using the projected transactions.

Referring now to FIG. 7(a), there is illustrated the process of using a set of projected transactions in order to add to the counts of the matrices maintained at a given level. As indicated at step 700, the block "Tau" of transactions is projected at a node Y having a corresponding matrix. At step 710, the counter i is set to 1, and at step 720, the $i^{th}$ transaction "T" from the block Tau is selected. For each pair of items in T, one is added to the count of the corresponding entry in the matrix, as indicated at step 730. A detailed description of how the transaction is used in order to add to the counts of the corresponding entries in the matrix is will be described in further detail in view of FIG. 7(b). Referring back to FIG. 7(a), at step 740, a check is made to determine whether all transactions in the block have already been used for the counting. If all transactions in the block have already been used for the counting, the process is terminated at step 760; otherwise, the process proceeds to step 750 where the transaction count "i" is incremented. The process steps 720–750 then repeat until all transactions in the block Tau have been used for the counting.

Figure 7B:
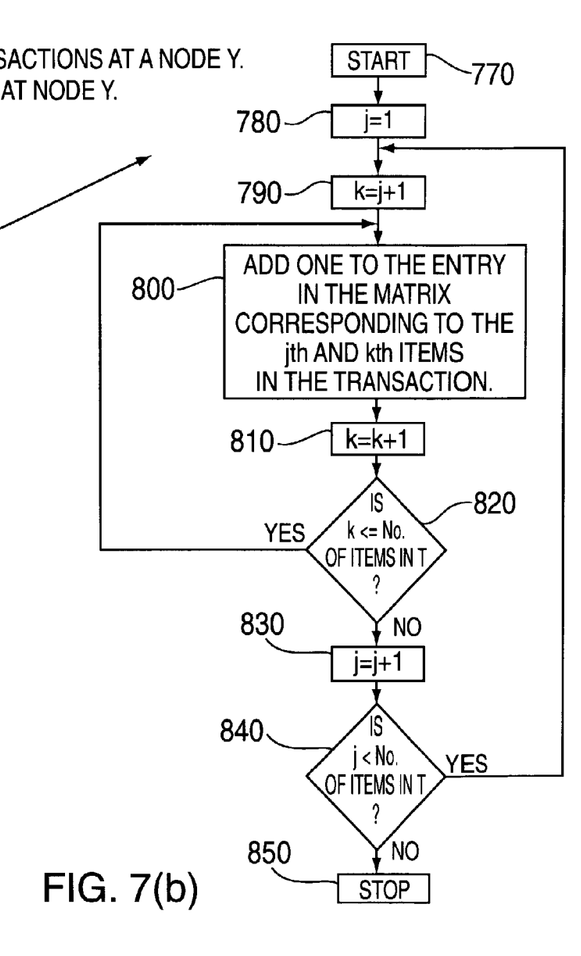

FIG. 7(b) illustrates the process of adding to the counts of the matrix maintained at a node by using a single transaction. For purposes of explanation, it is assumed that the counters for the item numbers in the transaction are j and k, i.e., j and k represent the position numbers of the items in the transaction when counting from the left. Thus, as indicated at step 780, j is set to 1, and at step 790, k is set to j+1. At step 800, a value of 1 is added to the entry in the matrix corresponding to the $j^{th}$ and $k^{th}$ items in the transaction. At step 810, the counter k is incremented by 1, and at step 820, a determination is made as to whether the counter k has reached the end of the transaction. If the counter k has not reached the end of the transaction, i.e., k<=number of items in T, then the next iteration is performed by returning to step 800; otherwise, the counter j is incremented by 1 as indicated at step 830. Then, at step 840, a check is made to determine whether j is less than the number of items in the transaction T, i.e., j<number of items in T. If j is less than the number of items in the transaction T, then the process returns to step 790 to reset counter k according to the new value of j; otherwise, the process terminates at step 850.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims. For instance, those skilled in the art may infer that it is not necessary for the methodology of the present invention to always create the nodes of the tree in breadth-first order. It is possible to either create the nodes depth-first or, in any combination of depth-first and breadth-first which may optimize performance.

Having thus described our invention, what we claim as new, and desire to secure by Letters Patent is:

1. A system for automatically generating associations of items comprising a plurality of transactions with each transaction including one or more items capable of forming said associations, said system comprising:

means for specifying a support criteria indicating a strength of desired associations of items;

means for imposing a lexicographic ordering of items;

means implementing said lexicographic ordering of items for recursively generating a hierarchical tree structure comprising nodes organized as one or more levels, each node representing an itemset having item associations determined to have satisfied said specified support criteria, said generating means further comprising means for characterizing nodes of said tree structure as being either active and enabling generation of new nodes at a lower level of said tree, or inactive, at any given time, said generating means comprising:

i) means for traversing said tree structure and projecting each of said transactions onto currently active nodes of said tree structure for generating projected transaction result sets at each said active node, said projected transaction result sets having items capable of forming nodes for extending said tree structure; and ii) counting means associated with a predetermined active node for counting said items included in said projected transaction result sets at said predetermined node, said counting of items used to determine whether new itemsets satisfy said specified support criteria.

2. The system as claimed in claim 1, wherein a specified business criteria includes the support of said itemset indicating strength of said association of items included therein, said support defined as the number of transactions having said itemset as a percentage of the total number of transactions in said database.

3. The system as claimed in claim 2, wherein said tree structure of nodes is organized as levels 0, 1, 2, . . . , k with level 0 comprising a null node, and level k comprising a current lowest level of said tree, said counting means including means for generating a matrix associated with an active node located at a level k−1 of said tree, said matrix having entries comprising candidate itemsets capable of being generated at a level k+1 of said tree, each matrix entry further having an associated counter that is incremented for counting support of corresponding item pairs included in said projected transaction set and represented as an entry in said matrix.

4. The system as claimed in claim 3, wherein said tree generating means for characterizing active nodes further includes means for generating active item list at each active node representing candidate frequent extensions for new nodes stemming from said active node.

5. The system as claimed in claim 4, wherein said projecting means includes means for determining an intersection of items included in each transaction of said database with said active item list associated with said active nodes to obtain a projected transaction set, said projected transaction set representing said original transaction and decreasing in size when being further projected to active nodes at lower levels of said tree structure, whereby counting of projected transaction results for new itemsets using projected transaction sets of reduced size is computationally efficient.

6. The system as claimed in claim 1, wherein said means for generating said tree structure implements a depth first node generation process.

7. The system as claimed in claim 6, wherein said means for projecting includes recursively projecting each of said transactions included in said database onto currently active nodes of said tree structure.

8. The system as claimed in claim 1, wherein said means for generating said tree structure implements a breadth first node generation process.

9. The system as claimed in claim 1, further comprising means for removing inactive nodes of said tree.

10. The system as claimed in claim 5, wherein a transaction is projected onto a node at level m of said tree structure having itemsets with m items only if said transaction contains the set of m items at that node and a required minimum number of items from said active items associated with said node.

11. The system as claimed in claim 10, wherein given that all nodes up to and including level k have been generated, said required minimum number of items depends on (k-m) for a node at level m.

12. The system as claimed in claim 3, wherein said counter means associated with said matrix entries counts all pairwise combinations of items comprising immediate frequent extensions of node k and included in said projected transactions, to thereby count support for all possible itemsets of length (k+2).

13. A method for automatically generating associations of items in a system including a plurality of transactions with each transaction including one or more items capable of forming said associations, said method comprising:
   a) specifying a support criteria indicating a strength of desired associations of items;
   b) imposing lexicographic ordering of items;
   c) implementing said lexicographic ordering of items for recursively generating a hierarchical tree structure comprising nodes organized as one or more levels of itemsets, each node representing an item set having item associations determined to have satisfied said specified support criteria,
   d) characterizing nodes of said tree structure as being either active and enabling generation of new nodes at a new level of said tree, or inactive, at any given time;
   e) traversing said tree structure and projecting each of said transactions onto currently active nodes of said tree structure to generate projected transaction result sets at each said active node; and
   f) counting said items included in said projected transaction result sets of said projected transactions at said active nodes to determine whether said further itemsets satisfy said specified support criteria and adding said itemsets meeting said specified support criteria to said tree structure at said new level.

14. The method as claimed in claim 13, wherein said tree structure of nodes is organized as levels 0, 1, 2, ..., k with level 0 comprising a null node, and level k comprising a current lowest level of said tree, said counting step including the steps of:
   generating a matrix associated with an active node located at a level k−1 of said tree, said matrix having entries comprising candidate itemsets capable of being generated at a level k+1 of said tree, each matrix entry further having an associated counter; and
   incrementing a corresponding counter for counting support of an item pair included in said projected transaction set and represented as an entry in said matrix.

15. The method as claimed in claim 14, wherein said step c) of characterizing active nodes further includes generating active item list at each active node representing candidate frequent extensions for new nodes stemming from said active node.

16. The method as claimed in claim 15, wherein said projecting step includes the step of determining an intersection of items included in each transaction with said active item list associated with said active nodes to obtain said projected transaction set, said projected transaction set representing said original transaction and decreasing in size when being further projected to active nodes at lower levels of said tree structure,
   whereby counting of projected transaction results for new itemsets using projected transaction sets of reduced size is computationally efficient.

17. The method as claimed in claim 13, wherein said step of characterizing nodes further includes the steps of maintaining an itemset of a generated node, maintaining a set of tree extensions at that generated node which are currently active, and, maintaining an active item list associated with said node, said method further including updating each set of active tree extensions and active item list corresponding to each node as said tree structure changes.

18. The method as claimed in claim 13, wherein said predetermined manner includes one of a depth first order, breadth first order, and, combination depth first, breadth first order tree traversal strategy.

19. The method as claimed in claim 18, wherein said traversal step includes recursively projecting each of said transactions onto currently active nodes of said tree structure.

20. The method as claimed in claim 13, further comprising the step of removing inactive nodes of said tree.

21. The method as claimed in claim 16, wherein a transaction is projected onto a node at level m of said tree structure having itemsets with m items only if said transaction contains the set of m items at that node and a required minimum number of items from said active items associated with said node.

22. The method as claimed in claim 21, wherein given that all nodes up to and including level k have been generated, said required minimum number of items depends on (k-m) for a node at level m.

23. The method as claimed in claim 14, wherein said counting step associated with said matrix entries includes counting all pairwise combinations of items comprising immediate frequent extensions of node k and included in said projected transactions, to count support for all possible itemsets of length (k+2).

24. A program storage device readable by a machine, tangibly embodying a program of instructions executable by the machine to perform method steps for automatically generating associations of items in a system of transactions wherein each transaction includes one or more items capable of forming said associations, said method steps comprising:
   a) specifying a support criteria indicating a strength of desired associations of items;
   b) imposing a lexicographic ordering of items;
   c) implementing said lexicographic ordering of items for recursively generating a hierarchical tree structure comprising nodes organized as one or more levels of itemsets, each node representing an itemset having item associations determined to have satisfied said specified support criteria,
   d) characterizing nodes of said tree structure as being either active and enabling generation of new nodes at a new level of said tree, or inactive, at any given time;
   e) traversing said tree structure and projecting each of said transactions onto currently active nodes of said tree structure to generate projected transaction result sets at each said active node; and
   f) counting said items included in said projected transaction result sets of said projected transactions at said active nodes to determine whether said further itemsets satisfy said specified support criteria and adding said itemsets meeting said specified support criteria to said tree structure at said new level.

25. The program storage device readable by a machine as claimed in claim 24, wherein said tree structure of nodes is organized as levels 0, 1, 2, ..., k with level 0 comprising a null node, and level k comprising a current lowest level of said tree, said counting step including the steps of:
   generating a matrix associated with an active node located at a level k−1 of said tree, said matrix having entries comprising candidate itemsets capable of being generated at a level k+1 of said tree, each matrix entry further having an associated counter; and incrementing a corresponding counter for counting support of an item pair included in said projected transaction set and represented as an entry in said matrix.

26. The program storage device readable by a machine as claimed in claim 25, wherein said step c) of characterizing active nodes further includes generating active item list at each active node representing candidate frequent extensions for new nodes stemming from said active node.

27. The program storage device readable by a machine as claimed in claim 26, wherein said projecting step includes the step of determining an intersection of items included in each transaction with said active item list associated with said active nodes to obtain said projected transaction set, said projected transaction set representing said original transaction and decreasing in size when being further projected to active nodes at lower levels of said tree structure, whereby counting of projected transaction results for new itemsets using projected transaction sets of reduced size is computationally efficient.

28. The program storage device readable by a machine as claimed in claim 24, wherein said step of characterizing nodes further includes the steps of maintaining an itemset of a generated node, maintaining a set of tree extensions at that generated node which are currently active, and, maintaining an active item list associated with said node, said method further including updating each set of active tree extensions and active item list corresponding to each node as said tree structure changes.

29. The program storage device readable by a machine as claimed in claim 24, wherein said predetermined manner includes one of a depth first order, breadth first order, and, combination depth first, breadth first order tree traversal strategy.

30. The program storage device readable by a machine as claimed in claim 24, wherein said traversing step includes recursively projecting each of said transactions onto currently active nodes of said tree structure.

31. The program storage device readable by a machine as claimed in claim 24, further comprising the step of removing inactive nodes of said tree.

32. The program storage device readable by a machine as claimed in claim 28, wherein a transaction is projected onto a node at level m of said tree structure having itemsets with m items only if said transaction contains the set of m items at that node and a required minimum number of items from said active items associated with said node.

33. The program storage device readable by a machine as claimed in claim 32, wherein given that all nodes up to and including level k have been generated, said required minimum number of items depends on (k-m) for a node at level m.

34. The program storage device readable by a machine as claimed in claim 25, wherein said counting step associated with said matrix entries includes counting all pairwise combinations of items comprising immediate frequent extensions of node k and included in said projected transactions, to count support for all possible itemsets of length (k+2).

* * * * *